Aug. 31, 1954 R. H. RAKESTRAW 2,687,596
PLANT TOPPER
Filed June 13, 1952
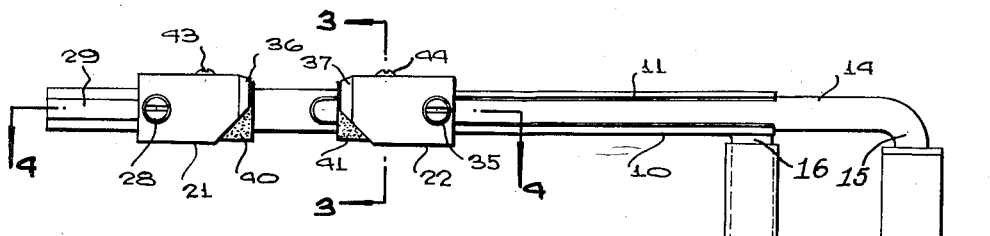
INVENTOR.
ROBERT H. RAKESTRAW
BY
McMorrow, Berman & Davidson
ATTORNEYS Patented Aug. 31, 1954

2,687,596

UNITED STATES PATENT OFFICE 2,687,596

PLANT TOPPER

Robert H. Rakestraw, Stoneville, N. C.

Application June 13, 1952, Serial No. 293,259

13 Claims. (Cl. 47—1)

This invention relates to a plant topper, and more particularly, to a topper of the type for topping tobacco plants.

This application is a continuation-in-part of my co-pending application for a tobacco topper, filed October 20, 1950, Serial No. 191,145, now abandoned.

An object of the present invention is to provide a plant topper which severs the stalk in such manner as to permit the sprout or sucker inhibiting fluid which is simultaneously applied to the stalk at the location of severance to drain freely from the severed portion of the stalk.

Another object of the present invention is to provide a plant topper in which a charge of sprout or sucker inhibiting fluid is applied to the stalk during the severance operation with precision and facility.

A further object of the present invention is to provide a plant topper which is simple in structure, positive in action, and commercially feasible.

Other objects of the present invention will become apparent from the following description taken in conjunction with the accompanying drawing, in which:

Figure 1 is a side elevational view of the tobacco topper according to the present invention.

Figure 2 is a bottom plan view of the topper of Figure 1.

Figure 3 is an enlarged sectional view taken on the line 3—3 of Figure 1.

Figure 4 is an enlarged sectional view taken on the line 4—4 of Figure 1.

Figure 5 is an enlarged sectional view taken on the line 5—5 of Figure 1.

Referring to the drawing, the numeral 10 designates a barrel which has one end 10' closed and the other end open, Figure 4, the barrel having a slot 11 extending longitudinally from the open end and terminating near and spaced from the closed end 10' of the barrel 10, Fig. 4. Positioned within the barrel 10, Fig. 4, near and spaced from the closed end 10' thereof and frictionally and slidably engaging the barrel is a packing assembly 12, the packing assembly being provided with an aperture 13 extending longitudinally therethrough. A tube 14 extends into the open end of the barrel 10 and has one end in communication with the aperture 13 of the packing assembly 12 and bears against the latter assembly, as clearly shown in Figure 4. Manually operable means is connected to the barrel 10 and the tube 14 for imparting relative movement to the same. The tube 14 has a portion 15 perpendicular or extending laterally with relation thereto, and this tube portion 15 carries a handle 15'. A tubular portion 16 is fixedly secured to the barrel 10 adjacent to its open end and is perpendicular to the barrel to extend laterally with relation thereto. The tubular portion 16 has a handle 16' mounted thereon, and the handle 16' is opposite the handle 15'. The lower or free end of the tubular portion 16, Fig. 2, is slotted, for receiving a bar 17, fixedly secured to the tube portion 15, and the bar 17 has longitudinally spaced openings 18, for receiving a cotter pin 19. This cotter pin can be inserted within a selected opening 18, and serves to limit the movement of the handle 16' from the handle 15'. A spring means or coil spring 20 is housed in the barrel 10 between the closed end 10' of the barrel and the packing assembly 12 for biasing the barrel 10 and tube 14 longitudinally outward.

A pair of receptacles 21 and 22 are provided, which are elongated and have their longitudinal axes extending longitudinally of the barrel 10. The receptacles have their inner ends open and have outer closed ends 21'. The receptacles are arranged in end to end relation, and their inner open ends are disposed in opposed relation. The receptacles 21 and 22 are arranged exteriorly of the barrel 10, as shown. The receptacle 21 is arranged near and spaced from the closed end 10' of the barrel 10. The receptacle 21 is provided adjacent to its closed end 21' with openings which receive a sleeve 23, fixedly secured within these openings, and this sleeve has one end fixedly secured to the barrel 10, so that the interior of the sleeve is in communication with a port 24, formed in the barrel 10. The port 24 is adapted to be covered and uncovered by a ball valve 26, seated by a spring 27. The outer end of the spring 27 engages a bolt 28 having screw threaded engagement within the sleeve 23. A diagonal brace 29 connects the barrel 10 and sleeve 23, as shown.

The receptacle 22 is provided adjacent to its closed end with openings for receiving a sleeve 30, fixedly secured within these openings, and one end of the sleeve 30 extends into the slot 11 and is fixedly secured to the tube 14. The bore of the sleeve 30 is in communication with a port 31, leading into the tube 14. The port 31 is covered and uncovered by a check ball valve 33, held seated by a coil spring 34, arranged within the sleeve 30, and engaging a bolt 35 having screw threaded engagement within the sleeve 30. The ball valve 26 controls the flow of the liquid from the barrel 10 into the tube 23, while the ball valve 33 controls the flow of the liquid from the tube 14 into the sleeve 30.

The receptacles 21 and 22 have cooperating cutting elements or blades 36 and 37 respectively on their inner open opposed ends, the cutting elements being on the upper portions of the opposed open ends of the receptacles. The lower portions of the opposed open ends of the receptacles 21 and 22 are cut away to provide arcuate recesses or openings 38 and 39 respectively. A body of sponge material, for example, Neoprene foam rubber, or other like substance of sponge-like character, is placed in the receptacles 21, 22, the bodies being respectively indicated by the numerals 40 and 41. The sponge bodies extend from the sleeves 23 and 30 to and slightly beyond the inner ends of the receptacles 21 and 22, Figure 4, and also across the recesses 38 and 39, Figure 2. The sponge body 40 is secured in place in the receptacle 21 by means of a threaded bolt 42 which is threaded into a threaded bushing 43 fixed to the body, and the sponge body 41 is likewise secured in place in the receptacle 22 by means of a threaded bolt 44 which is threaded into a threaded bushing 45 fixed to the body 41.

Connected with the free end of the transverse tube portion 15, is a valve device 46' for controlling the supply of the liquid sprout or sucker inhibiting fluid. This valve device comprises a casing 46, having screw threaded engagement with the end of the transverse tube portion 15, and also having screw threaded engagement with a coupling 47, to be secured to a hose 47' or the like. The inner end of the coupling 47 serves as a valve seat for a check ball valve 48. The free end of the tube portion 15 has notches or recesses 49 cut therein so that when the ball check valve seats against the end of the tube portion 15, Figure 5, the fluid can pass the ball valve by passing through the notches 49. When the ball valve seats on the coupling 47, the fluid cannot pass back into the coupling 47. The hose 47' leads to a suitable source of the liquid.

In operation of the plant topper of the present invention, a tobacco plant stalk adjacent the lower end of the bud or bloom is placed between the cutting edges, elements or blades 36 and 37 of the receptacles 21 and 22 with the receptacles in the spaced position of Figure 1. The handle 15' is held relatively stationary in the hand, and the handle 16' is moved toward the handle 15'. This results in the receptacle 21 being moved toward the receptacle 22 until their open opposed ends are brought together, severing the plant stalk. When the receptacle 21 moves toward the receptacle 22, the closed end 10' moves toward the packing assembly 12, and against the action of the spring 20. This movement of the closed end 10' causes the liquid contained in the barrel 10 and tube 14 to be placed under pressure, unseating ball valves 26 and 33. The liquid will then be supplied from the barrel 10 to the sponge body 40 and from the tube 14 to the sponge body 41, through the ports 50 and 52, respectively. When the ball valves 26 and 33 are unseated, the ball valve 48 is seated. When the handle 16' is released, the spring 20 moves it from the handle 15', and the closed end 10' moves from the packing assembly 12, resulting in the ball valves 26 and 33 being seated and ball valve 48 unseated, so that the fluid may flow into the barrel 10 and tube 14. In order that the receptacles 21 and 22 may be moved together, as explained, and the liquid fed to the sponge bodies 40 and 41, the receptacles must be fixedly attached to the sleeves 23 and 30, which in turn must be fixedly attached to the barrel 10 and tube 14, respectively. When the receptacles are moved together, the cutting elements or blades 36 and 37 sever the stalk, and the liquid is applied to that portion of the stalk which is then held within the receptacles 21 and 22, which receptacles are then in the closed position. The stalk passes through the recesses or openings 38 and 39. The receptacles 21 and 22 prevent the liquid from being improperly applied to the leaves of the plant.

Having thus described the invention what is claimed as new and desired to be secured by Letters Patent is:

1. A plant topper comprising a barrel having one end closed and the other end open, a packing assembly provided with an aperture extending longitudinally therethrough positioned within said barrel adjacent the closed end thereof and frictionally and slidably engaging said barrel, a hollow tube extending into the open end of said barrel and having one end in communication with the aperture in said bearing assembly and bearing against the latter assembly, manually operable means connected to said barrel and said tube for imparting relative movement toward and away from each other, a pair of receptacles arranged in confronting end to end spaced relation positioned exteriorly of and along said barrel, one of said receptacles being adjacent the closed end of and carried by said barrel and connected in communication with the barrel intermediate the closed end and said packing assembly and the other of said receptacles being adjacent to and spaced from said one end of said tube and connected in communication with said tube inwardly of said one end of said tube, a valve means in the communication connection of each of said receptacles for controlling the admission of fluid from said barrel and tube into the adjacent receptacle, cooperating cutting elements on the confronting ends of said receptacles, a body of sponge material disposed in each receptacle and having a portion exposed at the confronting end thereof, and another valve means on the other end of said tube for controlling the admission of fluid into said tube and barrel.

2. A plant topper comprising a barrel having one end closed and the other end open, a packing assembly provided with an aperture extending longitudinally therethrough positioned within said barrel adjacent the closed end thereof and frictionally and slidably engaging said barrel, a hollow tube extending into the open end of said barrel and having one end in communication with the aperture in said packing assembly and bearing against the latter assembly, manually operable means connected to said barrel and said tube for imparting relative movement toward and away from each other, a pair of receptacles arranged in confronting end to end spaced relation positioned exteriorly of and along said barrel, one of said receptacles being adjacent the closed end of and carried by said barrel and connected in communication with the barrel intermediate the closed end and said packing assembly and the other of said receptacles being adjacent to and spaced from said one end of said tube and connected in communication with said tube inwardly of said one end of said tube, a valve means in the communication connection of each of said receptacles for controlling the admission of fluid from said barrel and tube into the adjacent receptacle, cooperating cutting elements on the confronting ends of said receptacles, a body of sponge material disposed in each receptacle and having a portion exposed at the confronting end thereof, another valve means on the other end of said tube for controlling the admission of fluid into said tube and barrel, and spring means housed in said barrel between and operatively connected to the closed end and said packing assembly for biasing said barrel and said tube away from each other.

3. A plant topper comprising a barrel having one end closed and the other end open, a packing assembly provided with an aperture extending longitudinally therethrough positioned within said barrel adjacent the closed end thereof and frictionally and slidably engaging said barrel, a hollow tube extending into the open end of said barrel and having one end in communication with the aperture in said packing assembly and bearing against the latter assembly, manually operable means connected to said barrel and said tube for imparting relative movement toward and away from each other, a pair of receptacles arranged in confronting end to end spaced relation positioned exteriorly of and along said barrel, one of said receptacles being adjacent the closed end of and carried by said barrel and connected in communication with the barrel intermediate the closed end and said packing assembly and the other of said receptacles being adjacent to and spaced from said one end of said tube and connected in communication with said tube inwardly of said one end of said tube, a spring biased valve in the communication connection of each of said receptacles and actuable in response to relative movement of said barrel and tube toward each other for controlling the admission of fluid from said barrel and tube into the adjacent receptacle, cooperating cutting elements on the confronting ends of said receptacles, a body of sponge material disposed in each receptacle and having a portion exposed at the confronting end thereof, and another valve means on the other end of said tube and actuable in response to relative movement of said barrel and tube away from each other for controlling the admission of fluid into said tube and barrel.

4. A plant topper comprising a barrel having one end closed and the other end open, a packing assembly provided with an aperture extending longitudinally therethrough positioned within said barrel adjacent the closed end thereof and slidably engaging said barrel, a hollow tube extending into the open end of said barrel and having one end in communication with the aperture in said packing assembly and bearing against the latter assembly, manually operable means connected to said barrel and said tube for imparting relative movement away from each other, a pair of receptacles arranged in confronting end to end spaced relation positioned exteriorly of and along said barrel, one of said receptacles being adjacent the closed end of and carried by said barrel and connected in communication with the barrel intermediate the closed end and said packing assembly and the other of said receptacles being adjacent to and spaced from said one end of said tube and connected in communication with said tube inwardly of said one end of said tube, a spring biased valve in the communication connection of each of said receptacles and actuable in response to relative movement of said barrel and tube toward each other for controlling the admission of fluid from said barrel and tube into the adjacent receptacle, cooperating cutting elements on the confronting ends of said receptacles, a body of sponge material disposed in each receptacle and having a portion exposed at the confronting end thereof, another valve means on the other end of said tube and actuable in response to relative movement of said barrel and tube away from each other for controlling the admission of fluid into said tube and barrel, and spring means housed in said barrel between and operatively connected to the closed end and said packing assembly for biasing said barrel and tube away from each other.

5. An implement to apply a liquid to the stalk of a tobacco plant or the like, comprising receptacles having inner ends which are open, said inner ends being arranged in opposed relation, said inner ends having recesses formed therein for receiving portions of the stalk when the stalk is severed, means operatively connected with said receptacles for supporting said receptacles, and effecting a relative opening and closing movement between the receptacles, and supplying a liquid to the interior of the receptacles, the liquid being thereby applied to the parts of the stalk which are enclosed within the receptacles.

6. An implement to sever the stalk of a tobacco plant or the like and apply a liquid to such stalk, comprising receptacles having inner ends which are open, said inner ends being arranged in opposed relation, said inner ends having recesses formed therein for receiving portions of the stalk when the stalk is severed, means operatively connected with said receptacles for supporting said receptacles, and effecting a relative opening and closing movement between the receptacles, and supplying a liquid to the interior of the receptacles, the liquid being thereby applied to the parts of the stalk which are enclosed within the receptacles, and means associated with the receptacles and operated upon the relative closing movement between the receptacles to sever the stalk.

7. An implement to sever the stalk of a tobacco plant or the like and apply a liquid to such stalk, comprising receptacles having their inner ends open, said inner ends being arranged in opposed relation, said inner ends having recesses formed therein for receiving portions of the stalk when the stalk is severed, means operatively connected with said receptacles for supporting said receptacles, and effecting a relative opening and closing movement between the receptacles and for supplying a liquid to the interior of the receptacles, the liquid being thereby applied to the parts of the stalk which are enclosed within the receptacles and a blade for at least one receptacle and arranged near the inner end of the receptacle and connected with the receptacle for movement therewith.

8. An implement to sever the stalk of a tobacco plant or the like and apply a liquid to such stalk, comprising receptacles having inner ends which are open, said inner ends being arranged in opposed relation, said inner ends having recesses formed therein for receiving portions of the stalk when the stalk is severed, means operatively connected with said recetpacles for supporting said receptacles, and effecting a relative opening and closing movement between the receptacles, and supplying a liquid to the interior of the receptacles, elements arranged within the receptacles to apply the liquid supplied to the receptacles to the parts of the stalk enclosed within the receptacles, and means associated with the receptacles and operated upon the relative closing movement between the receptacles to sever the stalk.

9. An implement to sever the stalk of a tobacco plant or the like and apply a liquid to such stalk, comprising receptacles having inner ends which are open, said inner ends being arranged in opposed relation, said inner ends having recesses formed therein for receiving portions of the stalk when the stalk is severed, means operatively connected with said receptacles for supporting said receptacles, and effecting a relative opening and closing movement between the receptacles, and supplying a liquid to the interior of the receptacles, compressible absorbent elements arranged within the receptacles, and means associated with the receptacles and operated upon the relative closing movement between the receptacles to sever the stalk.

10. An implement to sever the stalk of a tobacco plant or the like and apply a liquid to such stalk, comprising receptacles having inner ends which are open, said inner ends being arranged in opposed relation, said inner ends having edges adapted to sever the stalk, said inner ends having recesses formed therein for receiving portions of the stalk when the stalk is severed, means operatively connected with said receptacles for supporting said receptacles, and effecting a relative opening and closing movement between the receptacles, and for supplying a liquid to the interior of the receptacles.

11. An implement to sever the stalk of a tobacco plant or the like and apply a liquid to such stalk, comprising receptacles having inner ends which are open, said inner ends being arranged in opposed relation, said receptacles being generally horizontal in use and provided at their inner ends and at their tops with blades adapted to sever the stalk, said receptacles being provided at their inner ends and at their bottoms with recesses for receiving the stalk, and means operatively connected with said receptacles for supporting said receptacles, and effecting a relative opening and closing movement between the receptacles, and for supplying a liquid to the interior of the receptacles.

12. An implement to sever the stalk of a tobacco plant or the like and apply a liquid to such stalk, comprising a receptacle having an inner open end and an outer closed end, said receptacle being provided at its inner open end and in its lower portion with a recess which leads to the inner open end for receiving said stalk, the inner end of said receptacle being provided with a blade arranged above said recess to sever the stalk, a member arranged in opposed relation to the inner end of said receptacle, means operatively connected with said receptacle and member for supporting the same and effecting a relative opening and closing movement between the receptacle and member, yielding means within the receptacle and moved inwardly by said stalk when said stalk is positioned within the recess, yielding means serving to apply a liquid to the exterior of the side of the stalk, and means to supply the liquid to the interior of said receptacle.

13. An implement to apply a liquid to the exterior of the side of the stalk of a tobacco plant or the like, comprising a tube, a handle secured to the tube, a second tube slidably mounted upon the first tube, a second handle secured to the second tube and arranged opposite the first handle, a spring effecting a relative opening movement between the handles, a casing mounted upon the second tube and having a closed end and an open end, the open end being adapted to receive the stalk, means of communication between the interior of the second tube and the interior of the casing, a check valve controlling said means of communication and opening toward said casing, means for supplying a liquid to the first tube including a check valve opening toward the first tube, and a yielding element arranged within the casing and moved inwardly by contact with the stalk when said stalk enters said casing through the open end of the casing, said yielding means serving to apply the liquid to the exterior of the side of said stalk.

References Cited in the file of this patent

UNITED STATES PATENTS

| Number | Name | Date |
|---|---|---|
| 954,126 | McAllister | Apr. 5, 1910 |
| 1,056,046 | Meyers | Mar. 18, 1913 |
| 1,640,635 | Atkins | Aug. 30, 1927 |
| 1,836,009 | Atkins | Dec. 15, 1931 |
| 1,965,799 | Federspiel | July 10, 1934 |
| 2,659,918 | Stoner | Nov. 24, 1953 |

FOREIGN PATENTS

| Number | Country | Date |
|---|---|---|
| 243,717 | Germany | Feb. 20, 1912 |
| 491,531 | Germany | Feb. 11, 1930 |
| 543,886 | Germany | Feb. 10, 1932 |
| 10,064 | Great Britain | of 1895 |